June 17, 1952 — A. BRUEGGER — 2,600,840
HOLDING MEANS FOR PREPARING ARTIFICIAL SILK CAKES FOLDABLE REELS
Filed Feb. 27, 1948 — 3 Sheets-Sheet 1
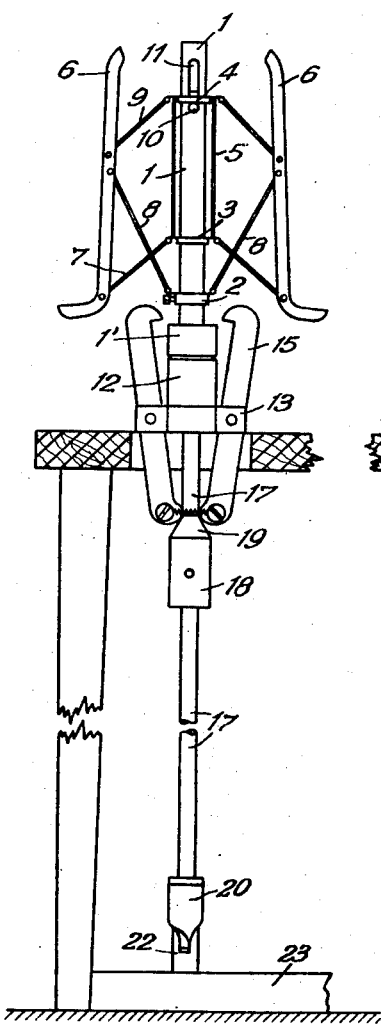
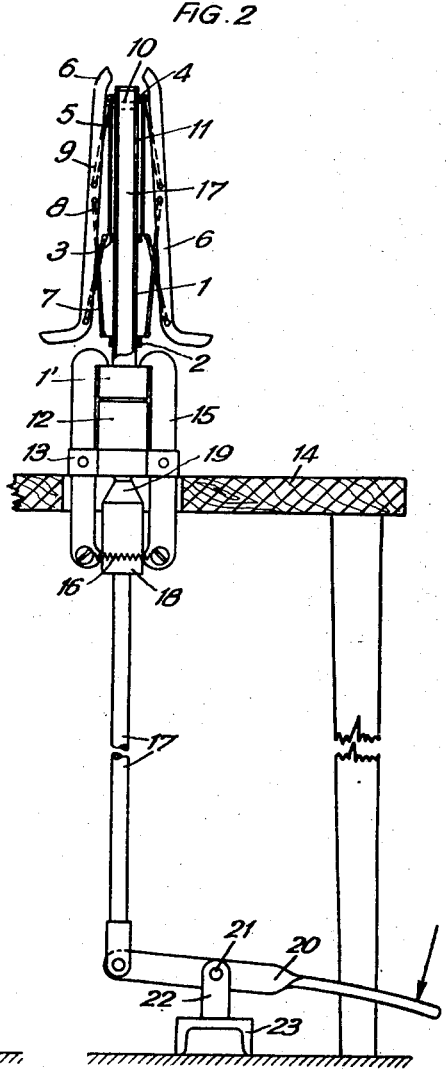
Inventor
Albert Bruegger
By Harry Langsam
Attorney

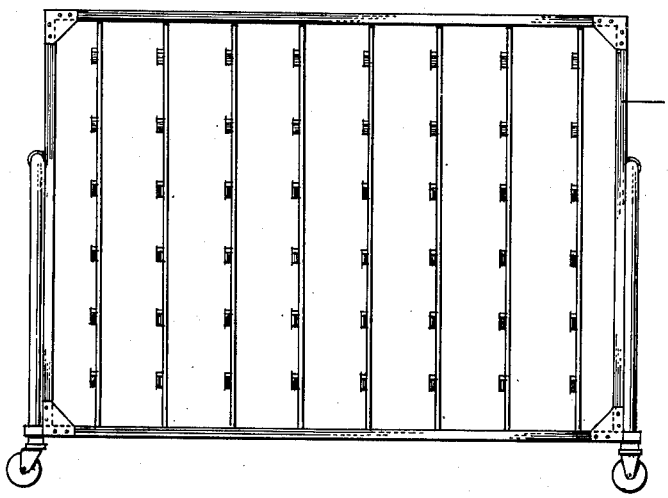
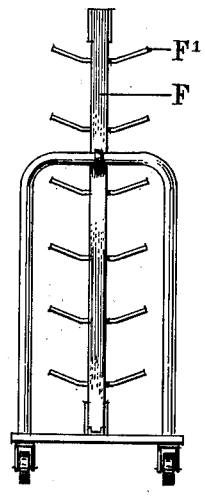
Fig. 8   Fig. 9
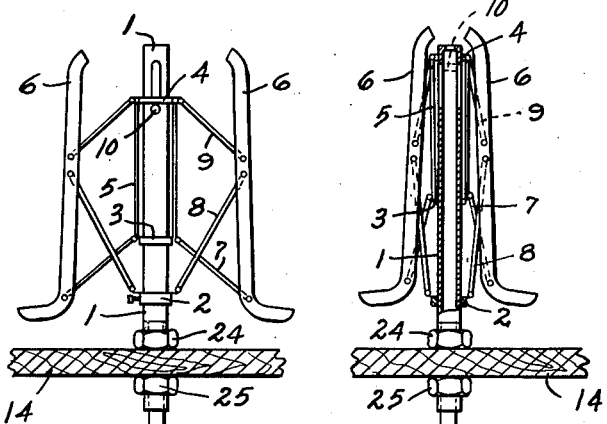
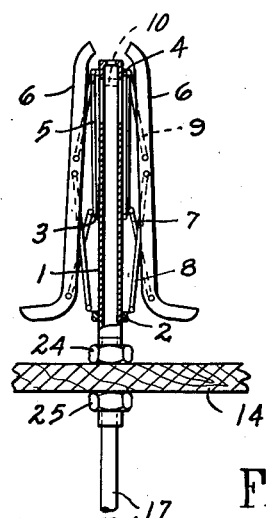
Fig. 3   Fig. 4
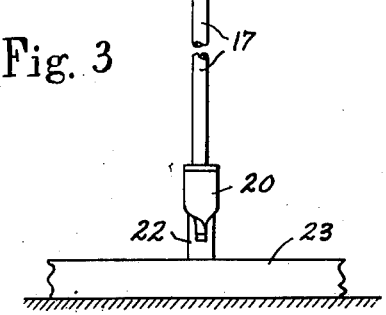
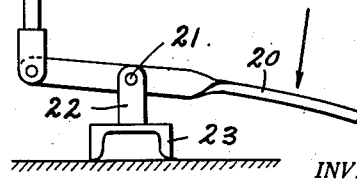
INVENTOR.
Albert Bruegger.
BY
Harry Langsam
ATTORNEY.

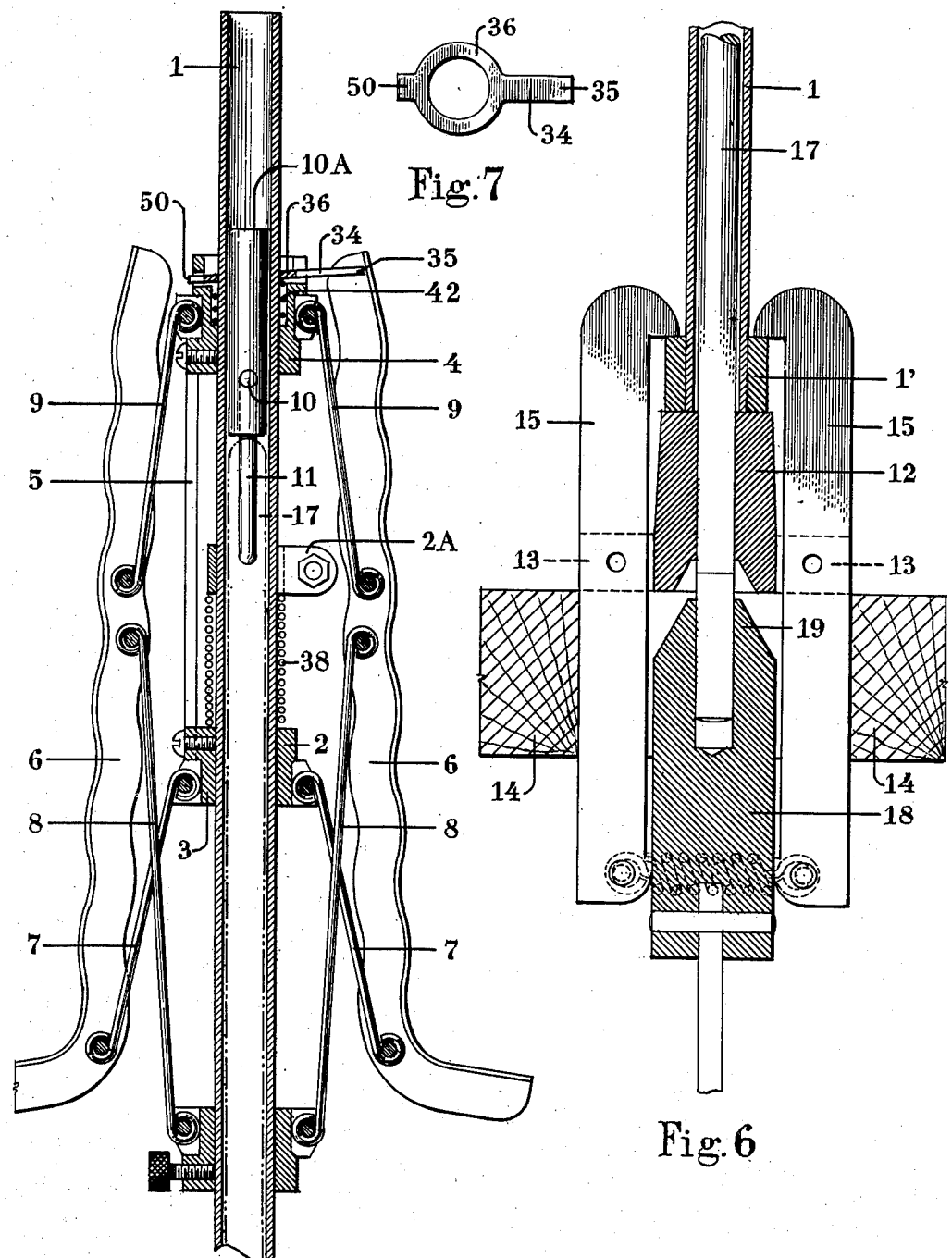

Patented June 17, 1952

2,600,840

UNITED STATES PATENT OFFICE 2,600,840

HOLDING MEANS FOR PREPARING ARTIFICIAL SILK CAKES FOLDABLE REELS

Albert Bruegger, Philadelphia, Pa.

Application February 27, 1948, Serial No. 11,734

10 Claims. (Cl. 242—112)

My invention relates to collapsible reels and relates particularly to reels for holding rayon cakes of thread.

Heretofore, rayon cakes have been placed upon a cakeholder which consisted of a circular base to which a cylindrical support was attached; an insert spread out the center of the cake and then the insert together with the cake was placed over the support. The difficulties encountered in winding rayon cakes upon the holders of the prior art originated because the rayon cakes are without any body or self support. Furthermore, in mounting the cake on the prior art holders, the insert must be held contracted by using one hand (this is tiring especially when the strong spring inserts are used) and the other hand is free to push the cake over the insert.

In order to simplify the mounting of rayon cakes upon suitable holding means, my invention consists of a protruding contractible reel which is adapted to be mounted so that a foot-controlled mechanical actuator will contract the reel.

The operation of contracting the reel by means of a foot pedal leaves the hands of the attendant free, so that the mounting of the rayon cake upon the reel is easily made, and can be carried out carefully by using both hands, as contrasted to the prior art devices thereby increasing the quantity of work and thereby increasing production.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 shows in fragment the first embodiment of my invention with the reel extended.

Fig. 2 is a similar representation but with the reel contracted.

Fig. 3 shows a fragmentary view of a modification of my invention.

Fig. 4 is a view of the modification with the reel contracted.

Fig. 5 is a fragmentary sectional view of the reel itself.

Fig. 6 is a detail of the telescopic arrangement between the reel and the mandrel.

Fig. 7 is a holding handle.

Fig. 8 is a view of the movable carrier whereby cakes of rayon may travel in a continuous flow to and from the mounting tables.

Fig. 9 is a side view of the movable carrier shown in Fig. 8.

Referring now in detail to the drawings, I show a rayon-cake expanding and collapsible reel and a foot control wherein the reel has a hollow shaft 1 which is encircled by a fixed collar 2 as well as two sliding rings 3 and 4; the sliding rings 3 and 4 are tied firmly together with a plurality of light bars 5. The cake supporting rods 6 are pivotally connected by links 7 to the sliding rings 3, each of the links 8 is pivoted at one end to the fixed collar 2 and is pivoted at its other end to the supporting rod 6; and each of the links 9 is pivoted at one end to the sliding ring 4 and its other end to the supporting ring 6. The sliding rings 3 and 4, together with the pivoted ends of the links 7, 8, and 9 cause the rayon supporting rods 6 to move substantially parallel to but closer to or away from the hollow reel shaft 1. The links 7, 9, the rod 6, and the connecting bar 5 forms a parallelogram.

A spiral spring 38 surrounding the reel shaft pushes the supporting bars 6 into an extended or normal position, as illustrated in Fig. 5.

Within the hollow reel shaft 1 is a rod 10A which has a single cross pin 10 extending through both of the guide slots 11. The cross pins 10 by abutting the extreme (upper and lower) ends of the guide slot limit the position of the supporting rods 6. In other words, the spring 38 presses downwardly on the movable ring 3 carrying with it ring 4 and the ring 4 presses downwardly on pins 10 so that the lower end of the slot 11 is contacted by the pins 10, thereby extending the reel to its normal position.

The reel shaft 1 has rigidly secured upon its lower end a shoulder ring or flange 1' which flange extends outwardly from the end of the shaft. The reel has the lower end of the shaft 1 loosely placed upon a hollow cylindrical ring 12 through which a push rod or shaft 17 passes, and the ring 12 is fastened to the surface of the table 14. A holder 13 is clamped to the ring 12 and the holder 13 pivotally supports two claw-levers or hooks 15. The hook end of the claw levers 15 clamps upon the shoulder ring 1' of the reel shaft 1 and the other ends of the claw levers are pushed apart by a cam 19 and its wide end 18. Upon releasing the claw levers they are pulled together by a tension spring 16 which constrains the claw levers 15 to assume the inoperative position shown in Fig. 1.

Referring now in greater detail to Fig. 5, I show the shaft 1 having a spring 38 anchored at its upper end to a stop 2A which is securely fastened to the shaft 1 and the lower end of the spring pushes upon the slidable ring 3 so that the ring 3 tends to be pushed downwardly at all times in order to spread the supporting rods 6 since the connecting links 8 and 9 move outwardly.

A freely movable rod 10A within the shaft 1 has a pin 10 pass therethrough and also through the elongated slots 11, 11 in the rod. The pin 10 is adapted to abut against the under side of the upper movable ring 4 so that when the push rod 17 abuts against the end of the rod 10A it moves the pin 10 as well as the ring 4 upwardly in order to collapse the reel. If the rod 17 were released the spring 38 would tend to push the reel to its open position as hereinbefore explained. However, to prevent the opening of the reel, I provide a lock 34 which has an opening 36 therein through which the shaft 1 passes. An extension 50 on the lock 34 oscillates in a complementary groove on the slide 4. An extension or handle 35 also is integrally formed on the lock 34 and a spring 42 anchored to the slide 4 abuts the lock 34 thereby urging the lock to bind against the shaft 1, thereby holding the slide 4 in position. To release the lock to enable the spring 38 to spread the reel, I press downwardly upon the handle 35 of the lock 34 thereby permitting the lock to be inoperative so far as holding the reel in closed position.

To repeat, the rod 17 projects inside the hollow shaft 1 and abuts the rod 10A which is attached to support carrying pins 10. The rod 17 also projects through the cylinder 12 and continues to the tapered or conical surface 19 on the leading guide member 18 of the extended end of the rod 17 which rod also is pivotally joined to a lever or pedal 20 which is pivoted at 21 to a support 22 that is placed on a floorboard 23.

By moving the pedal 20 in the direction of the arrow shown in Fig. 2, the rod 17 is moved upwardly through the cylindrical guide 12 thereby raising the tapered surface or cam 19 on the guide member 18 to shift the lower ends of the claw levers 15 apart so that the upper surface of the shoulder ring 1' of the reel shaft 1 is grasped. The reel is then firmly held to the cylinder 12, as shown in Fig. 2. The upward movement of the rod 17 through the hollow shaft 1 causes the rod 17 to engage the rod 10A on which the pin 10 is carried so that the cross pin 10 raises the upper slide ring 4 against the reaction of spring 38 and hence the lower slide ring moves in unison with the upper slide ring 4 thereby folding the supports 6 close to the center hollow shaft 1.

By stepping on the foot pedal 20 the reel is folded together, i. e., from its extended position in Fig. 1 to the folded position corresponding to Fig. 2, then a cake of rayon may be grasped with both hands and placed conveniently upon the reel, as is clear without further explanation. Afterwards, when the reel has been fitted with a rayon cake, the pedal 20 automatically swings back to its idle position; the rod 17 also is moved to its lowered position so that the reel is restored to its outstretched position by the spring 38, and the claws 15 open so that the reel may be removed.

Then the normally extended reel, upon whose supporting bars 6 the rayon-cakes rest under tension, may be removed from the cylinder 12 and the rod 17 and the reel may be brought to another working location, e. g., for the purpose of unwinding the rayon cakes.

If desired, the ring 12 can be fastened to support 13.

It is evident there can be a plurality of these holding devices hereinbefore described, arranged in a row on the same work table.

The holding means of my invention may also be employed with reels which are not shifted from their working positions, the reel may then be fixed to the machine.

The holding means corresponding to Figs. 3 and 4 is distinguished from the described embodiment such that the reel is seated in an opening by means of its hollow shaft 1, which opening is provided in a supporting mechanism 14A, which may be a part of a machine such as a winding machine. Two nuts 24 and 25 screwed upon the threads on the reel shaft 1 secure the reel firmly to the support 14. The rod 17 is here inserted directly into the hollow shaft 1 of the reel. The operation of the reel is similar to that embodiment of the invention already described. The rayon mass taken up on the reel is then available without further handling right at the adjacent work location of the machine.

It is equally suitable in all applications if the reel, while being fitted out with the rayon mass assumes a vertical, inclined, or if need be, horizontal position. Obviously, the changing of the reel diameters with corresponding development depends on the working mechanism exterior of the reel shaft, instead of the rod projecting inside the hollow shaft. The divided mechanical actuating assembly may be changed by the attendant by using their hand or their knee instead of foot-control, further. The assembly for holding the reel may, under condition, be molded integrally with the support, and it may be at the end of the machine or upon a table.

In many factories, it is recommended that this work be divided and that one or more girls be developed as cake mounting specialists. These girls are given separate tables apart from the winder where the mounting of the cakes is done expertly and rapidly. A portable supply frame, generally designated as F, is adapted to pins F1 on which the reels may be mounted. The frames may be pushed to separate mounting tables where the specialists mount the reels and then the mounted reels can be placed on the portable supply frame or carrier so that there is a continuous flow of mounted cakes from the mounting tables. The operator, therefore, loses no time in laying on the cakes; she is able to attend to many more reels. If cakes of thread are bad running, they may be returned on the same reel without further handling by way of the portable frames, checked, and if necessary, unreeled on a slow running machine by rotating the reel. Hence, the operator loses no time with bad cakes.

Other objects of my invention are to provide a carrier for cake wound reels to go from and to the winding machine or special winding places or to a table, and it may be at the end of the machine or upon a table.

Although my invention has been described in considerable detail, such description is intended as being illustrative rather than limiting, since the invention may be variously embodied, and the scope of the invention is to be determined as claimed.

I claim as my invention:

1. In combination, a collapsible reel for winding rayon cakes, a support for the reel, a mechanical actuator adapted to be brought into cooperation with the reel mounted upon the support in order to seize and to hold the reel, said mechanical actuator comprising a clamp to hold said reel, and a push rod to collapse said reel.

2. My invention as set forth in claim 1, said clamp including a claw simultaneously actuated by said rod whereby the claw firmly holds the reel upon said support, said reel being automatically actuated to a closed position when said clamp retains said reel, and extended and removable when said claws are opened.

3. In combination, a collapsible reel for winding rayon cakes and a support for said reel, means to collapse said reel, means to clamp said reel to said support, and a foot control lever to actuate said means to clamp said reel to said support.

4. In combination, a collapsible reel and a holding stand, said reel having a plurality of rayon supporting arms and a hollow shaft to which said arms are attached, a shoulder ring fastened to said hollow shaft, means for closing said supporting arms, a push rod within said hollow shaft to actuate said means, an actuating rod on said holding stand adapted to be inserted within said hollow shaft and being adapted to actuate said push rod, and a plurality of holding hooks on said stand adapted to engage and hold said shoulder ring.

5. My invention as set forth in claim 4 including a foot actuated means to actuate said holding hooks.

6. A reel having a hollow shaft and a ring surrounding said shaft, means connected to said ring for carrying a cake of thread, means to pull said ring downwardly so that the first named means will be expanded, means to hold said ring against the action of said second named means, and said last named means comprising a latch member located upon said hollow shaft and said ring for holding said ring against the reaction of said second named means.

7. The invention as set forth in claim 6 wherein said latch includes a ring member having a handle, and a spring abutting said ring member to retain said movable slides in position.

8. A collapsible reel for winding rayon cakes comprising a hollow shaft having a slot in a portion of its side, a plunger within said shaft, an extension on said plunger passing through said shaft slot, a pair of slidable rings movable in unison surrounding said shaft, a fixed ring on said shaft, a plurality of cake supports, and means connected to said supports and said slidable and fixed rings whereby said supports may be moved closer to or away from said shaft, and a spring engaging said fixed ring and one of said slidable rings to urge the cake supports open at all times.

9. A collapsible reel for winding rayon cakes comprising a hollow shaft for carrying a plurality of collars, a plurality of cake supporting rods, a plurality of links pivotally connected to said collars and to said rods, means to collapse said reel, a support, means to clamp said shaft to said support, a foot control lever, and means on said foot control lever to actuate the first named means and to clamp said reel to said support.

10. A collapsible reel for winding rayon cakes comprising a hollow shaft for carrying a plurality of collars, a plurality of cake supporting rods, a plurality of links pivotally connected to said collars and to said rods, means to collapse said reel, a support, means to clamp said shaft to said support, a foot control lever, and means on said foot control lever to actuate the second named means and to clamp said reel to said support, and a rod joined to said last named means which rod serves as the first named means to collapse said reel.

ALBERT BRUEGGER.

REFERENCES CITED

The following references are of record in the file of this patent:

UNITED STATES PATENTS

| Number | Name | Date |
|---|---|---|
| 788,969 | Walker | May 2, 1905 |
| 1,365,975 | Folmer | Jan. 18, 1921 |
| 1,838,813 | Drake | Dec. 29, 1931 |
| 2,285,826 | Naumann | June 9, 1942 |

FOREIGN PATENTS

| Number | Country | Date |
|---|---|---|
| 22,793 | Netherlands | Feb. 16, 1931 |
| 42,611 | Denmark | July 14, 1930 |
| 330,614 | Great Britain | June 10, 1930 |
| 679,999 | France | Jan. 17, 1930 |